United States Patent
Goto et al.

(10) Patent No.: US 6,935,917 B1
(45) Date of Patent: Aug. 30, 2005

(54) DISCHARGE SURFACE TREATING ELECTRODE AND PRODUCTION METHOD THEREOF

(75) Inventors: Akihiro Goto, Tokyo (JP); Toshio Moro, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/787,359
(22) PCT Filed: Jul. 16, 1999
(86) PCT No.: PCT/JP99/03830
§ 371 (c)(1), (2), (4) Date: Mar. 16, 2001
(87) PCT Pub. No.: WO01/05545
PCT Pub. Date: Jan. 25, 2001

(51) Int. Cl.⁷ .......................... H01J 29/04; H01T 14/00
(52) U.S. Cl. .................... 445/51; 427/580; 219/69.17
(58) Field of Search .................... 445/51; 427/580, 427/540, 399; 219/69.17, 69.2, 69.14; 204/164; 422/186.03

(56) References Cited

U.S. PATENT DOCUMENTS

| 3,711,397 A | * | 1/1973 | Martinsons | 205/474 |
| 4,042,484 A | * | 8/1977 | Thiele et al. | 204/290.08 |
| 4,373,947 A | * | 2/1983 | Buttner et al. | 75/228 |
| 4,940,300 A | * | 7/1990 | Giorgi | 313/559 |
| 5,804,789 A | * | 9/1998 | Saito et al. | 219/69.17 |
| 5,836,796 A | * | 11/1998 | Danroc | 445/24 |
| 5,858,479 A | * | 1/1999 | Saito et al. | 427/580 |
| 5,860,844 A | * | 1/1999 | Susukida et al. | 445/51 |
| 5,977,697 A | * | 11/1999 | Jin et al. | 313/310 |
| 6,024,622 A | * | 2/2000 | Ohoshi | 445/51 |
| 6,086,684 A | * | 7/2000 | Saito et al. | 148/220 |
| 6,303,076 B1 | * | 10/2001 | Yamamoto et al. | 419/14 |
| 6,348,668 B1 | * | 2/2002 | Moro et al. | 219/69.17 |
| 6,365,008 B1 | * | 4/2002 | Goto et al. | 204/164 |
| 6,441,333 B1 | * | 8/2002 | Goto et al. | 219/69.15 |
| 6,501,232 B1 | * | 12/2002 | Goto et al. | 315/291 |
| 6,525,461 B1 | * | 2/2003 | Iwasaki et al. | 313/495 |

FOREIGN PATENT DOCUMENTS

| DE | 12 79 208 | 10/1968 | |
| DE | 197 01 170 | 7/1997 | |
| DE | 197 09 190 | 12/1997 | |
| JP | 62 127 448 | 6/1987 | |
| JP | 9-192937 | 7/1997 | ............ B23H/9/00 |
| JP | 10-225824 | 8/1998 | ............ B23H/9/00 |
| JP | 11-827 | 1/1999 | ............ B23H/9/00 |

OTHER PUBLICATIONS

12th International Symposium For Electromachining (ISEM) pp. 271–278.
International Search Report (foreign language).
PCT/JP98/01088 filed Mar. 16, 1998 w/ English Abstract.

* cited by examiner

Primary Examiner—Joseph Williams
Assistant Examiner—Dalei Dong
(74) Attorney, Agent, or Firm—Sughrue Mion, PLLC

(57) ABSTRACT

In an electrode for electric discharge surface treatment used in electric discharge surface treatment for forming a hard coating on the surface of a treated material through the energy by generating electric discharge between the electrode and the treated material, a TiC powder (11) which is metal carbide and a TiH$_2$ powder (12) which is metal hydride are mixed and heating treatment is performed after compression molding and hydrogen in the TiH$_2$ powder (12) is desorbed to make a Ti powder (13) and a practical electrode (10) for electric discharge surface treatment having moderate strength and crumbliness as well as safety is formed.

20 Claims, 3 Drawing Sheets

HEAT TREATMENT

DISCHARGE SURFACE TREATING ELECTRODE AND PRODUCTION METHOD THEREOF

BACKGROUND OF THE INVENTION

1. Technical Field

This invention relates to improvements in an electrode for electric discharge surface treatment and a manufacturing method thereof used in electric discharge surface treatment operations for forming a hard coating made of an electrode material on the surface of a treated material or a hard coating made of a substance in which the electrode material reacts by electric discharge energy through the energy by generating electric discharge between the electrode and the treated material.

2. Background Art

Conventionally, as a technique of forming a hard coating on the surface of a treated material to provide corrosion resistance or abrasion resistance, there is an electric discharge surface treatment method disclosed in, for example, JP-A-5-148615. This technique is an electric discharge surface treatment method of a metal material comprising two steps of performing primary processing (deposition processing) using a green compact electrode obtained by mixing a WC (tungsten carbide) powder and a Co (cobalt) powder to perform compression molding and then performing secondary processing (remelting processing) by replacing the green compact electrode with an electrode with relatively small electrode consumption such as a copper electrode. In this method, a hard coating having strong adhesion strength to a steel material can be formed, but it is difficult to form a hard coating having strong adhesion strength to a sinter material such as cemented carbide. However, according to our research, it has been found that when a material for forming hard carbide such as Ti (titanium) is used as an electrode and electric discharge is generated between the electrode and a metal material which is a treated material, a strong hard coating can be formed on the surface of the metal which is the treated material without a process of remelting. This is because carbon which is a component in processing liquid reacts with the electrode material consumed by the electric discharge to form TiC (titanium carbide). Also, it has been found that when by a green compact electrode of metal hydride such as TiH$_2$ (titanium hydride), electric discharge is generated between the electrode and a metal material which is a treated material, a hard coating with the adhesion higher than that of the case of using a material such as Ti can speedily be formed. Further, it has been found that when by a green compact electrode in which other metals or ceramics are mixed with the hydride such as TiH$_2$, electric discharge is generated between the electrode and a metal material which is a treated material, a hard coating with various properties such as hardness or abrasion resistance can speedily be formed. Such a method is disclosed in, for example, JP-A-9-192937, and a configuration example of an apparatus used in such electric discharge surface treatment will be described by way of FIG. 3. In the drawing, numeral 1 is a green compact electrode obtained by compressedly molding a TiH$_2$ powder, and numeral 2 is a treated material, and numeral 3 is a processing bath, and numeral 4 is a processing liquid, and numeral 5 is a switching element for performing switching of voltage and current applied to the green compact electrode 1 and the treated material 2, and numeral 6 is a control circuit for performing on-off control of the switching element 5, and numeral 7 is a power source, and numeral 8 is a resistor, and numeral 9 is a hard coating formed. By such a configuration, the hard coating 9 having strong adhesion strength can be formed on the surface of the treated material 2 such as steel or cemented carbide through electric discharge energy by generating electric discharge between the green compact electrode 1 and the treated material 2.

There is a problem in that an electrode used in such electric discharge surface treatment is difficult to handle unless the electrode has a certain degree of strength and also the electrode crumbles excessively by electric discharge energy at the time of the electric discharge surface treatment and the electrode material cannot adhere to the surface of the treated material in a state of melting. Also, in case that the strength of the electrode is high and the electrode hardens excessively, there is a problem in that the electrode is difficult to crumble by electric discharge energy at the time of the electric discharge surface treatment and processing efficiency reduces. Thus, the electrode for electric discharge surface treatment requires moderate strength and crumbliness. As a material having such properties, metal hydride is given, but since there is danger of spontaneous combustion in case that the metal hydride touches at water, there is a problem in a safety standpoint. Therefore, a practical electrode for electric discharge surface treatment including the metal hydride in the electrode material cannot be obtained.

BRIEF SUMMARY OF THE INVENTION

This invention is implemented to solve the problems, and an object of the invention is to obtain a practical electrode for electric discharge surface treatment and a manufacturing method thereof capable of reducing manufacturing costs while improving processing efficiency of electric discharge surface treatment and having superior safety.

With an electrode for electric discharge surface treatment according to a first invention, in the electrode for electric discharge surface treatment used in electric discharge surface treatment for forming a hard coating on the surface of a treated material through the energy by generating electric discharge between the electrode and the treated material, at least a powder of metal carbide and a powder of metal hydride are mixed and heating treatment is performed after compression molding and hydrogen in the metal hydride is desorbed to be formed.

With an electrode for electric discharge surface treatment according to a second invention, in the first invention, the metal carbide is titanium carbide and the metal hydride is titanium hydride.

DETAILED DESCRIPTION OF THE INVENTION

Figure 1A:
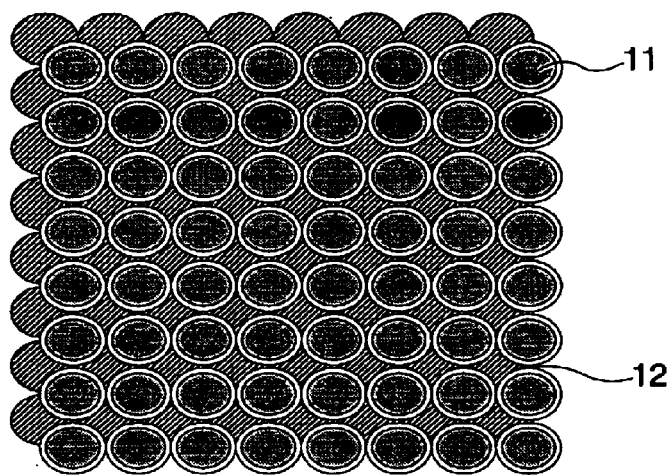
FIGS. 1(a) and 1(b) are illustrations showing an electrode for electric discharge surface treatment and a manufacturing method thereof according to this invention.

With an electrode for electric discharge surface treatment according to a third invention, in the first invention, a mixture ratio of the powder of the metal carbide to the powder of the metal hydride is set according to desired electrode strength and crumbliness.

With a manufacturing method of an electrode for electric discharge surface treatment according to a fourth invention, in the manufacturing method of an electrode for electric discharge surface treatment used in electric discharge surface treatment for forming a hard coating on the surface of a treated material through the energy by generating electric discharge between the electrode and the treated material, at least a powder of metal carbide and a powder of metal hydride are mixed and heating treatment is performed after compression molding and hydrogen in the metal hydride is desorbed to manufacture the electrode for electric discharge surface treatment.

With a manufacturing method of an electrode for electric discharge surface treatment according to a fifth invention, in the fourth invention, the metal carbide is titanium carbide and the metal hydride is titanium hydride.

With a manufacturing method of an electrode for electric discharge surface treatment according to a sixth invention, in the fourth invention, a mixture ratio of the powder of the metal carbide to the powder of the metal hydride is set according to desired electrode strength and crumbliness.

This invention has the following effects since the invention is constructed as described above.

An electrode for electric discharge surface treatment according to the first invention and the second invention has an effect of providing a low cost and superior safety. Also, in electric discharge surface treatment using this electrode for electric discharge surface treatment, there is an effect capable of improving processing efficiency while forming a good hard coating on the treated material.

An electrode for electric discharge surface treatment according to the third invention has an effect similar to that of the first invention, and also the electrode for electric discharge surface treatment having strength and crumbliness of the electrode suitable for desired electric discharge surface treatment characteristics can be obtained, and in electric discharge surface treatment using this electrode for electric discharge surface treatment, there is an effect capable of forming a good hard coating according to characteristics of the treated material.

A manufacturing method of an electrode for electric discharge surface treatment according to the fourth invention and the fifth invention has an effect capable of stably supplying an electrode for electric discharge surface treatment with a low cost and superior safety. Also, in electric discharge surface treatment using the electrode for electric discharge surface treatment manufactured by this manufacturing method, there is an effect capable of improving processing efficiency while forming a good hard coating on the treated material.

A manufacturing method of an electrode for electric discharge surface treatment according to the sixth invention has an effect similar to that of the fourth invention, and also the electrode for electric discharge surface treatment having strength and crumbliness of the electrode suitable for desired electric discharge surface treatment characteristics can be manufactured, and in electric discharge surface treatment using this electrode for electric discharge surface treatment, there is an effect capable of forming a good hard coating according to characteristics of the treated material.

BEST MODE FOR CARRYING OUT THE INVENTION

As shown in the background art, an electrode for electric discharge surface treatment requires moderate strength and crumbliness and in metal hydride which is a material having such properties, there is a problem in a safety standpoint. Thus, it is necessary to manufacture an electrode made of a material having strength and crumbliness suitable for an electrode for electric discharge surface treatment similar to the metal hydride and no problem in the safety standpoint. According to experiments performed on various materials for this purpose, it has been found that the strength of a green compact electrode in which a powder is compressedly molded has a close relation to hardness of the powder. That is, when the powder has high hardness (for example, metal carbide etc.), a shape of the powder is difficult to change even when performing compression molding, so that the molding is difficult or there is a property of becoming brittle even when the molding is possible. Also, when the powder has low hardness (for example, powder of metal single etc.), the powder deforms easily when performing compression molding, so that there is a property of hardening strongly.

Therefore, it has been found that an electrode for electric discharge surface treatment having desired strength and crumbliness can be obtained by mixing powders with different hardness at a predetermined mixture ratio to perform compression molding.

Next, a case of manufacturing an electrode by mixing a TiC powder which is metal carbide (high hardness) and a Ti powder which is a metal single (low hardness) as powders with different hardness to perform compression molding will be described as one example. As an electrode for electric discharge surface treatment, it is necessary to make a particle diameter of the electrode material powders to approximately 10 $\mu$m or less in order to improve electric discharge characteristics in electric discharge surface treatment, but since Ti is a sticky material, it is difficult to decrease the particle diameter of the Ti powder. That is, in order to grind the powder, an apparatus called a ball mill for putting the powder and balls of ceramics into a cylindrical vessel to rotate them is generally used, but in the case of the Ti powder even using such an apparatus, since Ti is a sticky material, a deformation of the powder occurs, but fineness of the powder does not proceed too much. Thus, in the case that the electrode material is the Ti powder, since fineness of a particle diameter of the electrode material powder suitable for the electrode for electric discharge surface treatment requires extremely high manufacturing costs, a practical electrode for electric discharge surface treatment cannot be obtained.

Therefore, it is important to select electrode materials capable of mixing powders with different hardness at a predetermined mixture ratio in order to provide desired strength and crumbliness to the electrode for electric discharge surface treatment and also performing fineness of a particle diameter of these powders at practical manufacturing costs. An illustration of an electrode for electric discharge surface treatment and a manufacturing method thereof according to this invention using the electrode materials selected from such a viewpoint is shown in FIG. 1. In the drawing, numeral 10 is an electrode for electric discharge surface treatment according to this invention, and numeral 11 is a TiC powder which is a metal carbide powder, and numeral 12 is a $TiH_2$ powder which is a metal hydride powder, and numeral 13 is a Ti powder which is a metal single powder. Also, FIG. 2 is one example of an electric discharge surface treatment apparatus constructed using the electrode for electric discharge surface treatment according to this invention, and in the drawing, numeral 2 is a treated material, and numeral 3 is a processing bath, and numeral 4 is a processing liquid, and numeral 5 is a switching element for performing switching of voltage and current applied to interelectrode, and numeral 6 is a control circuit for performing on-off control of the switching element 5, and numeral 7 is a power source, and numeral 8 is a resistor, and numeral 10 is an electrode for electric discharge surface treatment according to this invention, and numeral 14 is a hard coating formed on the treated material 2. By such a configuration, the hardcoating 14 having strong adhesion strength can be formed on the surface of the treated material 2 through electric discharge energy by generating electric discharge between the electrode 10 for electric discharge surface treatment and the treated material 2.

Figure 1B:
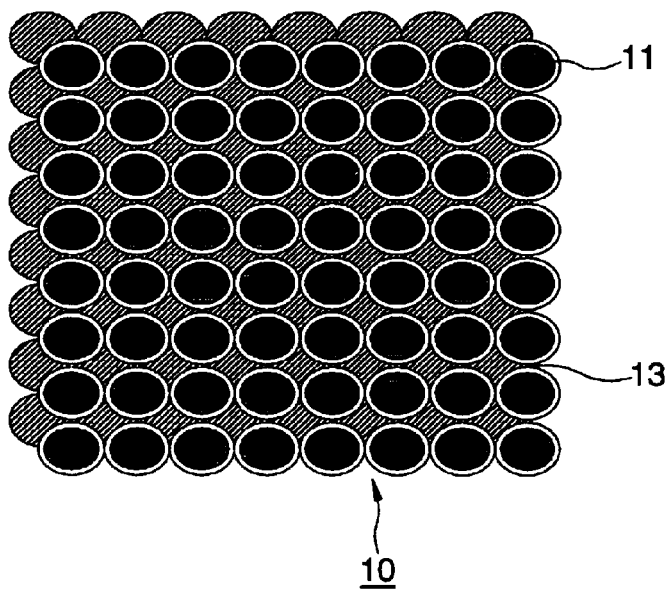
Figure 2:
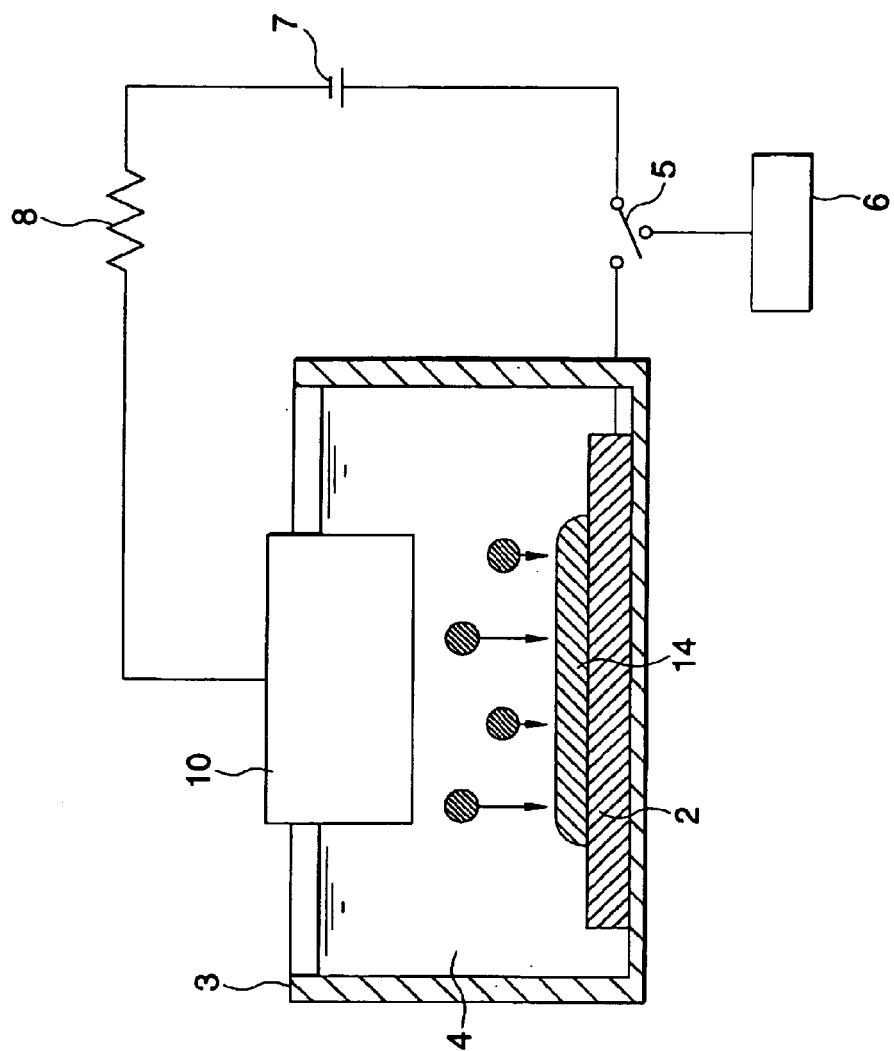
FIG. 2 is an illustration showing a configuration example of an electric discharge surface treatment apparatus using the electrode for electric discharge surface treatment according to the invention.
Figure 3:
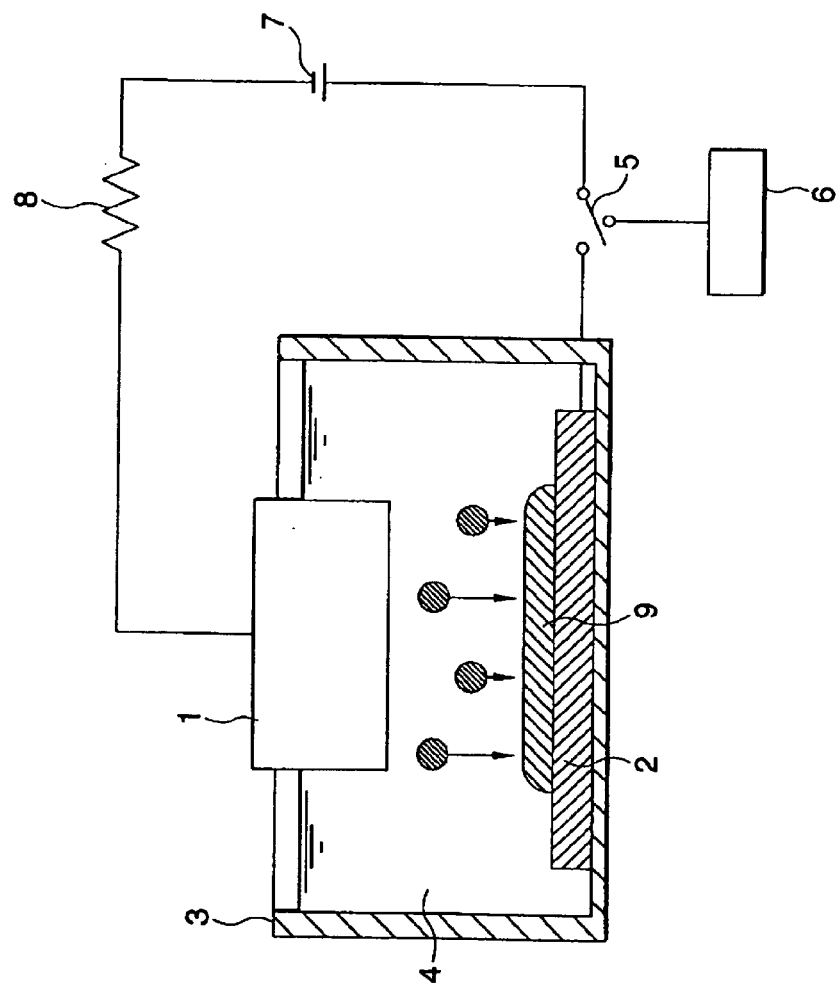
FIG. 3 is an illustration showing a configuration example of an electric discharge surface treatment apparatus using a conventional electrode for electric discharge surface treatment.

In FIG. 1A, the TiC powder 11 is a material of high hardness and the $TiH_2$ powder 12 is a material of low hardness. As described above, strength and crumbliness of the electrode can be adjusted by a mixture ratio of these powders. By experiment, it has been found that compression molding can be performed at a mixture ratio of the TiC powder 11 to the $TiH_2$ powder 12 with the range approximately from 1:9 to 9:1 and strength of a green compact increases with an increase in the mixture ratio of the $TiH_2$ powder 12. Therefore, by changing a mixture ratio of this metal carbide powder to the metal hydride powder, the strength of the green compact can be changed and thus the strength and crumbliness of the electrode can be changed.

Also, the compression molding can be performed by putting the mixed powders which are the electrode materials into a metal mold and applying a pressure with a press and so on.

By forming the green compact made of the TiC powder 11 which is the metal carbide powder and the TiHz powder 12 which is the metal hydride powder in this manner, a reduction (1 μm to 3 μm or less) in the particle diameter is facilitated. This is because the TiC is easy to manufacture a fine powder industrially and also it is possible to grind the $TiH_2$ very easily. For example, when the TiC powder with a small particle diameter and the $TiH_2$ powder with a large particle diameter are mixed and grinding treatment of the powders is performed by the ball mill, the $TiH_2$ powder becomes fine and the mixed powders of TiC and $TiH_2$ with the small particle diameter can be obtained. In this manner, the powders with the small particle diameter can easily be formed, so that manufacturing costs of the powders can be reduced.

However, when the powders remain this state, the powders are low in strength and tend to crumble for use in an electrode for electric discharge surface treatment. Also, there is danger of spontaneous combustion by including titanium hydride. Thus, by mixing the TiC powder and the $TiH_2$ powder at a predetermined mixture ratio and performing heating treatment of the green compact (FIG. 1A) obtained by compression molding and decomposing the $TiH_2$ to desorb hydrogen and making metal Ti, a practical electrode 10 for electric discharge surface treatment (FIG. 1B) having moderate strength and crumbliness as well as safety can be obtained.

The heating treatment can be performed, for example, by applying high-frequency heating to the green compact of FIG. 1A in an electric furnace.

By such a manufacturing method, processing efficiency of electric discharge surface treatment can be improved, and a low-cost electrode for electric discharge surface treatment with superior safety can stably be supplied.

In the above description, the case of using the TiC powder as a metal carbide powder and the $TiH_2$ powder as a metal hydride powder has been shown, but similar effects are obtained even when using other metal carbide powders and metal hydride powders.

INDUSTRIAL APPLICABILITY

As described above, an electrode for electric discharge surface treatment according to this invention is suitable for use in electric discharge surface treatment operations. Also, a manufacturing method of the electrode for electric discharge surface treatment according to this invention is suitable for manufacture of the electrode for electric discharge surface treatment.

What is claimed is:

1. An electrode for electric discharge surface treatment comprising a compressed mixture of at least a powder of metal carbide and a powder of metal hydride from which hydrogen is desorbed before performing an electric discharge surface treatment operation.

2. The electrode for electric discharge surface treatment as defined in claim 1, wherein the metal carbide is titanium carbide and the metal hydride prior to hydrogen desorption is titanium hydride.

3. The electrode for electric discharge surface treatment as defined in claim 1, wherein the ratio of the powder of the metal carbide to the powder of the metal hydride is set according to desired electrode strength and crumbliness.

4. A manufacturing method of an electrode for electric discharge surface treatment as claimed in claim 1, comprising mixing at least a powder of metal carbide and a powder of metal hydride; compression molding and desorbing hydrogen in the metal hydride before performing an electric discharge surface treatment operation; and subsequently performing heat treatment to manufacture the electrode for electric discharge surface treatment.

5. An electrode for electric discharge surface treatment as claimed in claim 1, obtained by mixing at least a powder of metal carbide and a powder of metal hydride;
   compression molding the mixture and desorbing hydrogen in the metal hydride before performing an electric discharge surface treatment operation; and
   subsequently performing heat treatment to manufacture the electrode for electric discharge surface treatment.

6. A method for discharge surface treating a work using an electrical discharge machine comprising positioning an electrode as claimed in claim 1, comprising a compressed mixture of at least a powder of metal carbide and a powder of metal hydride from which hydrogen is desorbed before performing an electric discharge surface treatment operation opposite a material to be surface treated; and
   forming a coating on the material by causing electrical discharge between the electrode and the material.

7. The electrode for electric discharge surface treatment as defined in claim 3, wherein the ratio of the powder of the metal carbide to the powder of the metal hydride is 1:9 to 9:1.

8. A manufacturing method of an electrode for electric discharge surface treatment as claimed in claim 1, comprising steps of;
   mixing at least a powder of metal carbide and a powder of metal hydride;
   performing compression molding of the mixture of the powders to form the electrode; and subsequently
   desorbing hydrogen from the hydride so as to manufacture the electrode comprising metal carbide and metal for electric discharge surface treatment.

9. The manufacturing method of an electrode for electric discharge surface treatment as defined in claim 8, wherein the metal carbide is titanium carbide and metal hydride is titanium hydride.

10. The manufacturing method of an electrode for electric discharge surface treatment as defined in claim 8, wherein a mixing ratio of the powder of the metal hydride is set according to desired electrode strength and crumbliness.

11. The manufacturing method of an electrode for electric discharge surface treatment as defined in claim 10, wherein the ratio of the powder of the metal carbide to the power of the metal hydride is 1:9 to 9:1.

12. The manufacturing method of an electrode for electric discharge surface treatment as defined in claim 4, characterized in that the metal carbide is titanium carbide and the metal hydride is titanium hydride.

13. The manufacturing method of an electrode for electric discharge surface treatment as defined in claim 4, wherein a mixing ratio of the powder of the metal carbide to the powder of the metal hydride is set according to desired electrode strength and crumbliness.

14. The manufacturing method of an electrode for electric discharge surface treatment as defined in claim 13, wherein the mixing ratio of the powder of the metal carbide to the powder of the metal hydride is 1:9 to 9:1.

15. The electrode for electric discharge surface treatment as defined in claim 5, wherein the metal carbide is titanium carbide and the metal hydride is titanium hydride.

16. The electrode for electric discharge surface treatment as defined in claim 5, wherein the ratio of the powder of the metal carbide to the powder of the metal hydride is set according to desired electrode strength and crumbliness.

17. The electrode for electric discharge surface treatment as defined in claim 16, wherein the ratio of the powder of the metal carbide to the power of the metal hydride is 1:9 to 9.1.

18. The method as defined in claim 6, wherein the metal carbide is titanium carbide and the metal hydride is titanium hydride.

19. The method as defined in claim 6, wherein the ratio of the powder of the metal carbide to the powder of the metal hydride is set according to desired electrode strength and crumbliness.

20. The electrode for electric discharge surface treatment as defined in claim 19, wherein the ratio of the powder of the metal carbide to the powder of the metal hydride is 1:9 to 9:1.

* * * * *